3,452,020
2-ALKENYL AND 2-ALKYNYL SUBSTI-
TUTED - TETRAHYDRO - HALO-SUL-
FAMYL-QUINAZOLINONES
Bola Vithal Shetty, Rochester, N.Y., assignor to Wallace & Tiernan Inc., East Orange, N.J., a corporation of Delaware
No Drawing. Continuation-in-part of application Ser. No. 517,995, Jan. 3, 1966. This application Nov. 9, 1967, Ser. No. 681,894
Int. Cl. C07d 51/48; A61k 27/00
U.S. Cl. 260—256.5                     9 Claims

ABSTRACT OF THE DISCLOSURE 1,2,3,4-tetrahydro-halo-sulfamyl-4-quinazolinone characterized by having in the 3-position a substituted or unsubstituted aryl or aralkyl group, and by having in the 2-position a substituted or unsubstituted alkenyl or alkynyl group.

---

This application is a continuation, in part, of my copending application Ser. No. 517,995 filed Jan. 3, 1966, now U.S. Patent 3,360,518, the disclosure of which is hereby incorporated by reference.

This invention relates to 1,2,3,4-tetrahydro-6-sulfamyl-3-aryl or 3-aralkyl compounds having diuretic properties, and more particularly to such compounds substituted in the 7-position with a halogen or haloalkyl and in the 2-position with a substituted or unsubstituted alkenyl or alkynyl group.

In accordance with this invention 1,2,3,4-tetrahydro-7-halo or 7-haloalkyl-6-sulfamyl-3-aryl- or 3-aralkyl-4-quinazolinone compounds have in the 2- position alkenyl, thioalkenyl or alkynyl groups substituted with hydrogen, furyl, thienyl, phenyl, pyridyl, amino, or pyrrolidyl. These compounds, like the compounds having hydrogen or alkyl groups in the 2-position, are effective diuretics which may be orally administered to animals with safety and effectiveness in a manner and in dosage amount like hydrochlorthiazide and like the exemplary compound of Ser. No. 517,995 now U.S. Patent 3,360,518.

The compounds of this invention are preferably of the following formula:

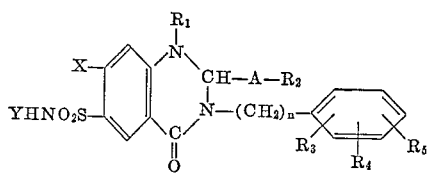

in which X is halogen or trifluoromethyl, Y is hydrogen or loweralkyl, $R_1$ is hydrogen, loweralkyl or phenyl, A is loweralkenylene, thioloweralkenylene, or loweralkynylene, $R_2$ is hydrogen, $NH_2$, lowercycloalkyl, furyl, thienyl, phenyl, pyridyl, or pyrrolidyl, $R_3$ is hydrogen, loweralkyl, hydroxy, alkoxy, $NH_2$, $SO_2NH_2$, halogen or trifluoromethyl, $R_4$ and $R_5$ are any of $R_3$, and $n$ is an integer from 0-4.

The term loweralkylene or loweralkynylene means divalent unsaturated aliphatic radicals with not more than 8 carbon atoms in a straight chain.

In the above formula X is preferably chlorine or trifluoromethyl, but bromide and the other halogens are not precluded. $R_1$ is preferably hydrogen, but loweralkyls such as methyl, ethyl, propyl, and isopropyl may be used. $R_2$ is preferably allyl, $R_3$, $R_4$, and $R_5$ may be any of the stated radicals in one or more of the ortho, meta or para positions. Preferably $R_3$ is methyl in the ortho position, also where sulfamyl is used it is preferably present in the meta or para position with methyl in the ortho position.

Specific suitable compounds of the above formula include:

2-allyl-3-o-tolyl-6-sulfamyl-7-chloro-1,2,3,4-tetrahydro-4-quinazolinone;
2-allyl-2-o-tolyl-6-sulfamyl-7-trifluoromethyl-1,2,3,4-tetrahydro-4-quinazolinone;
2-acetenyl-3-o-tolyl-6-sulfamyl-7-chloro-1,2,3,4-tetrahydro-4-quinazolinone;
2-acetylenyl-3-o-tolyl-6-sulfamyl-7-trifluoromethyl-1,2,3,4-tetrahydro-4-quinazolinone;
2-butenyl-3-o-tolyl-6-sulfamyl-7-chloro-1,2,3,4-tetrahydro-4-quinazolinone;
2-allyl-3-o-tolyl-6-methylaminosulfonyl-7-chloro-1,2,3,4-tetrahydro-4-quinazolinone;
2-allyl-3-(p-chlorophenyl)-6-sulfamyl-7-chloro-1,2,3,4-tetrahydro-4-quinazolinone;
2-allyl-3-o-tolyl-6-methylaminosulfonyl-7-chloro-1,2,3,4-tetrahydro-4-quinazolinone;
2-allyl-3-phenyl-6-sulfamyl-7-chloro-1,2,3,4,-tetrahydro-4-quinazolinone;
2-allyl-3-(2'-methyl-3'-chlorophenyl)-6-sulfamyl-7-chloro-1,2,3,4-tetrahydro-4-quinazolinone;
2-allyl-3-(p-chlorophenyl)-6-methylaminosulfonyl-7-chloro-1,2,3,4-tetrahydro-4-quinazolinone;
2-allyl-3-(2'-methylbenzyl)-6-methylaminosulfonyl-7-chloro-1,2,3,4-tetrahydro-4-quinazolinone;
2-allyl-3-o-tolyl-6-methylaminosulfonyl-7-chloro-1,2,3,4-tetrahydro-4-quinazolinone;
2-allyl-3-(p-chlorophenyl)-6-sulfamyl-7-chloro-1,2,3,4-tetrahyro-4-quinazolinone;
2-allyl-3-o-tolyl-6-methylaminosulfonyl-7-chloro-1,2,3,4-tetrahydro-4-quinazolinone;
2-allyl-3-phenyl-6-sulfamyl-7-chloro-1,2,3,4,-tetrahydro-4-quinazolinone;
2-allyl-3-(2'-methyl-3'-chlorophenyl)-6-sulfamyl-7-chloro-1,2,3,4-tetrahydro-quinazolinone;
2-allyl-3-(p-chlorophenyl)-6-methylaminosulfonyl-7-chloro-1,2,3,4-tetrahydro-4-quinazolinone;
2-allyl-3-(2'-methylbenzyl)-6-sulfamyl-7-chloro-1,2,3,4-tetrahydro-4-quinazolinone;
2-phenylallyl-3-o-tolyl-6-sulfamyl-7-chloro-1,2,3,4-tetrahydro-4-quinazolinone;
2-propenyl-3-o-tolyl-6-sulfamyl-7-chloro-1,2,3,4-tetrahydro-4-quinazolinone;
2-isopropenyl-3-o-tolyl-6-sulfamyl-7-chloro-1,2,3,4-tetrahydro-4-quinazolinone;
2-propenyl-3-o-tolyl-6-sulfamyl-7-trifluoromethyl-1,2,3,4-tetrahydro-4-quinazolinone;
2-propenyl-3-o-tolyl-6-sulfamyl-7-trifluoromethyl-1,2,3,4-tetrahydro-4-quinazolinone;
2-furylallyl-3-o-tolyl-6-sulfamyl-7-chloro-1,2,3,4-tetrahydro-4-quinazolinone;
2-thienylallyl-3-o-tolyl-6-sulfamyl-7-chloro-1,2,3,4-tetrahydro-4-quinazolinone;
2-pyridylallyl-3-o-tolyl-6-sulfamyl-7-chloro-1,2,3,4-tetrahydro-4-quinazolinone;
2-piperidylallyl-3-o-tolyl-6-sulfamyl-7-chloro-1,2,3,4-tetrahydro-4-quinazolinone;
2-morpholinallyl-3-o-tolyl-6-sulfamyl-7-chloro-1,2,3,4-tetrahydro-4-quinazolinone;
2-phthalimidoallyl-3-o-tolyl-6-sulfamyl-7-chloro-1,2,3,4-quinazolinone;
2-pyridylallyl-3-o-tolyl-6-sulfamyl-7-chloro-1,2,3,4-tetrahydro-4-quinazolinone;
2-furylthio-3-o-tolyl-6-sulfamyl-7-chloro-1,2,3,4-tetrahydro-4-quinazolinone;
2-thiomethylallyl-3-o-tolyl-6-sulfamyl-7-chloro-1,2,3,4-tetrahydro-4-quinzolinone;

2-allyl-3-(o-hydroxyphenyl)-6-sulfamyl-7-chloro-1,2,3,4-tetrahydro-4-quinzolinone;
2-allyl-3-(o-methoxyphenyl)-6-sulfamyl-7-chloro-1,2,3,4-tetrahydro-4-quinazolinone;
2-allyl-3-(p-aminophenyl)-6-sulfamyl-7-chloro-1,2,3,4-tetrahydro-4-quinazolinone;
2-allyl-3-(2'-methyl-4'-aminophenyl)-6-sulfamyl-7-chloro-1,2,3,4-tetrahydro-4-quinazolinone;
2-allyl-3-(2'-methyl-3'-sulfamylphenyl)-6-sulfamyl-7-chloro-1,2,3,4-tetrahydro-4-quinazolinone;
2-allyl-3-(2'-methyl-3'-sulfamylphenyl)-6-sulfamyl-7-trifluoromethyl-1,2,3,4-tetrahydro-4-quinazolinone;
2-n-butenyl-3-(2'-methyl-3'-chlorophenyl)-6-sulfamyl-7-trifluoromethyl-1,2,3,4-tetrahydro-4-quinazolinone;
2-allyl-3-(2'-methyl-3'-chlorophenyl)-6-methylaminosulfonyl-7-chloro-1,2,3,4-tetrahydro-4-quinazolinone;
2-propenyl-3-(2'-sulfamylphenyl)-6-sulfamyl-7-chloro-1,2,3,4-tetrahydro-4-quinazolinone;
2-cyclopentylallyl-3-o-tolyl-6-sulfamyl-7-chloro-1,2,3,4-tetrahydro-4-quinazolinone;
2-cyclobutylallyl-3-o-tolyl-6-sulfamyl-7-chloro-1,2,3,4-tetrahydro-4-quinzolinone;
2-cyclobutylpropenyl-3-o-tolyl-6-sulfamyl-7-trifluoromethyl-1,2,3,4-tetrahydro-4-quinazolinone;
2-cyclopropylallyl-3-o-tolyl-6-sulfamyl-7-chloro-1,2,3,4-tetrahydro-4-quinazolinone;
2-cyclopropylthioallyl-3-o-tolyl-6-sulfamyl-7-trfluoromethyl-1,2,3,4-tetrahydro-4-quinazolinone;
2-allyl-3-benzyl-6-sulfamyl-7-chloro-1,2,3,4-tetrahyro-4-quinazolinone;
2-furylacetylenyl-3-o-tolyl-6-sulfamyl-7-chloro-1,2,3,4-tetrahydro-4-quinazolinone;
1-methyl-2-allyl-3-o-tolyl-6-sulfamyl-7-chloro-1,2,3,4-tetrahydro-4-quinazolinone;
1-methyl-2-phenylallyl-3-o-tolyl-6-sulfamyl-7-chloro-1,2,3,4-tetrahydro-4-quinazolinone;
2-allyl-3-(2'-methyl-4'-chlorophenyl)-6-sulfamyl-7-chloro-1,2,3,4-tetrahydro-4-quinazolinone;
2-cyclobutylallyl-3-o-tolyl-6-sulfamyl-7-chloro-1,2,3,4-tetra-hydro-4-quinazolinone;
2-allyl-3-(2'-trifluoromethyl-4'-aminophenyl)-6-sulfamyl-7-chloro-1,2,3,4-tetrahydro-4-quinazolinone;
the sodium salt of 2-allyl-3-o-tolyl-6-sulfamyl-7-chloro-1,2,3,4-tetrahydro-4-quinazolinone; and
the potassium salt of 2-allyl-3-o-tolyl-6-sulfamyl-7-chloro-1,2,3,4-tetrahydro-4-quinazolinone.

Other specific suitable compounds are those in which the allyl of the 2-allyl compound is replaced by propenyl, isopropenyl, any of the butenyl radicals, or acetylenyl or like radicals preferably of not more than eight carbon atoms in a straight chain.

The following table gives illustrative suitable compounds in tabular form:

TABLE

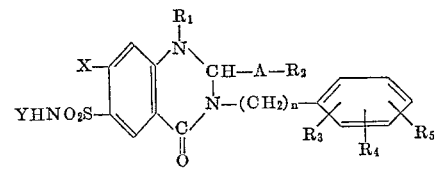

| R₁ | R₂ | R₃ | R₄ | R₅ | X | Y | n | A |
|---|---|---|---|---|---|---|---|---|
| H | H | 2-Me | H | H | Cl | H | 0 | —CH=CH— |
| Me | H | 2-Me | H | H | Cl | H | 0 | —CH=CH— |
| Ph | H | 2-Me | H | H | Cl | H | 0 | —CH=CH— |
| H | Furyl | 2-Me | H | H | Cl | H | 0 | —CH=CH— |
| H | Thienyl | 2-Me | 3-Me | H | Cl | H | 0 | —CH=CH— |
| H | Furyl | 2-Me | 4-OH | H | Cl | H | 0 | —CH=CH— |
| H | do | 2-Me | 4-NH₂ | H | Cl | H | 0 | —CH=CH— |
| H | do | 2-Me | H | H | Cl | Me | 0 | —CH=CH— |
| H | Thienyl | 2-Me | H | H | Cl | H | 0 | —CH=CH— |
| H | do | 2-Me | H | H | Br | H | 0 | —CH=CH— |
| H | H | 2-Me | H | H | Cl | H | 0 | —CH₂CH=CH— |
| Me | H | 2-Me | H | H | Cl | H | 0 | —CH₂CH=CH— |
| Ph | H | 2-Me | H | H | Cl | H | 0 | —CH₂CH=CH— |
| H | Furyl | 2-Me | H | H | Cl | H | 0 | —CH₂CH=CH— |
| H | Thienyl | 2-Me | 3-Me | H | Cl | H | 0 | —CH₂CH=CH— |
| H | Furyl | 2-Me | 4-OH | H | Cl | H | 0 | —CH₂CH=CH— |
| H | do | 2-Me | 4-NH₂ | H | Cl | H | 0 | —CH₂CH=CH— |
| H | do | 2-Me | H | H | Cl | Me | 0 | —CH₂CH=CH— |
| H | Thienyl | 2-Me | H | H | Cl | H | 0 | —CH₂CH=CH— |
| H | do | 2-Me | H | H | Br | H | 0 | —CH₂CH=CH— |
| H | H | 2-Me | H | H | Cl | H | 0 | —CH₂SCH₂CH=CH₂— |
| Me | H | 2-Me | H | H | Cl | H | 0 | —CH₂SCH₂CH=CH₂— |
| Ph | H | 2-Me | H | H | Cl | H | 0 | —CH₂SCH₂CH=CH₂— |
| H | Furyl | 2-Me | H | H | Cl | H | 0 | —CH₂SCH₂CH=CH₂— |
| H | Thienyl | 2-Me | 3-Me | H | Cl | H | 0 | —CH₂SCH₂CH=CH₂— |
| H | Furyl | 2-Me | 4-OH | H | Cl | H | 0 | —CH₂SCH₂CH=CH₂— |
| H | do | 2-Me | 4-NH₂ | H | Cl | H | 0 | —CH₂SCH₂CH=CH₂— |
| H | do | 2-Me | H | H | Cl | Me | 0 | —CH₂SCH₂CH=CH₂— |
| H | Thienyl | 2-Me | H | H | Cl | H | 0 | —CH₂SCH₂CH=CH₂— |
| H | do | 2-Me | H | H | Br | H | 0 | —CH₂SCH₂CH=CH₂— |
| H | H | 2-Me | H | H | Cl | H | 1 | —CH=CH— |
| H | H | 2-Me | H | H | Cl | H | 2 | —CH=CH— |
| H | H | 2-Me | H | H | Cl | H | 3 | —CH=CH— |
| H | H | 2-Me | H | H | Cl | H | 4 | —CH=CH— |
| H | H | 2-Me | H | H | Cl | H | 5 | —CH=CH— |
| H | H | 2-Me | H | H | Cl | H | 0 | —CH=CH—CH₂— |
| H | H | 2-Me | H | H | Cl | H | 0 | —C≡C— |
| H | H | 2-Me | H | H | Cl | H | 0 | —CH=CH— |
| H | Ph | 2-Me | H | H | Cl | H | 0 | —CH=CH—CH=CH— |
| H | Ph | 2-Me | H | H | Cl | H | 0 | —CH=CH— |
| H | H | 2-Me | H | H | Cl | H | 0 | —CH=CH— |

Me=methyl. Ph=phenyl.

Preparation of 2-allyl-3-(o-tolyl)-6-sulfamyl-7-chloro-1,2,3,4-tetrahydro-4-quinazolinone Synthetic route:

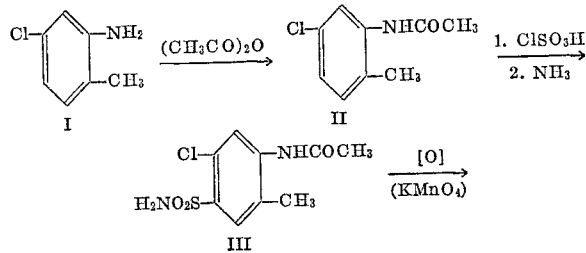

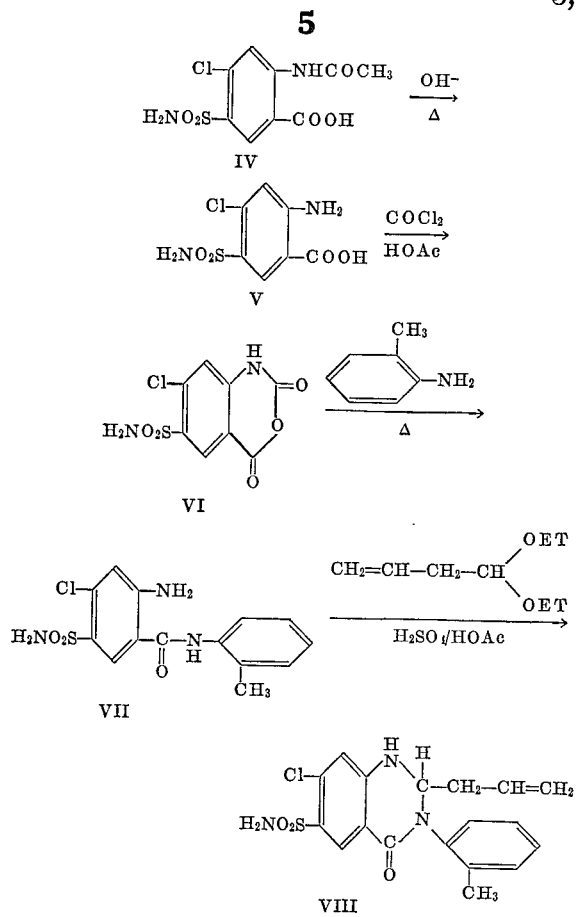

Preparation of 5-chloro-2-methylacetanilide, II.—5-chloro-o-toluidine (I), (1000 gm.) was added to 9000 ml. of water, preheated to 35°, in a 4½ gallon battery jar. The slurry was vigorously stirred while 1260 gm. acetic anhydride was carefully added. Stirring was continued for four hours, then the product was filtered off and air dried. The crude product was recrystallized from 7500 ml. of benzene, using 40 gm. charcoal to remove some colored material. The product was air dried. It weighed 818 gm. and melted at 138–139°. This lot was combined with the material from lot numbers, 741–811, 741–859, 741–874, 745–612, 741–994, and 740–482. The total weight was 11 kg. from 10.4 kg. of starting material.

Preparation of 5-chloro-2-methyl-4-sulfamylacetanilide, III.—Chlorosulfonic acid (1000 gm.) was placed in a nitrogen flushed 5 liter, 3 neck round bottom flask fitted with a stirrer and a calcium chloride tube. 5-chloro-2-methylacetanilide (300 gm.) was cautiously added to the chlorosulfonic acid, and then 88 gm. sodium chloride was added portionwise over one hour. The reaction mixture was cautiously raised to 80° C. (foaming occurs). When the foaming had subsided, the temperature was raised to 92° C. and held there for three hours. The hot reaction mixture was added slowly with good agitation to 4000 ml. of acetone and 1500 gm. of ice. The resulting slurry was diluted with water to a total volume of 8000 ml. and the crude sulfonyl chloride was filtered off and washed with water. The damp filter cake was added to 3000 ml. of concentrated ammonium hydroxide, stirred at room temperature for one hour and then heated to 50° C. for two hours. The slurry was cooled, filtered, washed with water and air dried. The weight of product was 186 gm. It melted at 248–250°. This material was combined with that made in runs 741–863, 741–886, 747–505, 747–507, 747–903, and 745–647. The total weight of product was 4 kg. from 11 kg. starting material.

Preparation of N-acetyl-4-chloro-5-sulfamyl anthranilic acid, IV.—Into a 12 liter flask was introduced 8000 ml. water, 1144 gm. magnesium sulfate heptahydrate and 400 gm. 5-chloro-2-methyl-4-sulfamylacetanilide. The mixture was heated to 80° and 710 gm. potassium permanganate was added portionwise with good stirring over about four hours at 80–85°. The mixture was kept at 80–85° for three hours after the permanganate addition was completed and then it was filtered hot. The manganese dioxide cake was washed with three 1000 ml. portions of water. The filtrate was made acid with 200 ml. concentrated hydrochloric acid, filtered, washed with water and air dried. The crude product was combined with the crude product obtained from runs 743–858, 747–552, 742–237, 745–685, 747–529, and 740–245, giving a total weight of 2833 gm. This material was dissolved (under Lot #745–687), in 100 liters of 95% ethanol. The resulting solution was concentrated to a total volume of 10 liters, periodically filtering off the product that had crystallized out and washing this with 95% ethanol. The yield of purified product was 2500 gm. melting at 264–266°, from 3 kg. of starting material.

Preparation of 4-chloro-5-sulfamylanthanilic acid, V.—N-acetyl-4-chloro-5-sulfamylanthranilic acid (2500 gm.) was refluxed for three hours in 15,000 ml. 3 N sodium hydroxide solution, then brought to a pH of four with concentrated hydrochloric acid. After allowing it to cool to about 70°, the product was filtered off and washed with water. The wet product was dissolved in 200 liters of boiling water, filtered hot and allowed to cool. When filtered, washed with water and air dried, the product weighed 2000 gm. and melted at 275–276°.

Preparation of 7-chloro-6-sulfamylisatoic anhydride, VI.—4-chloro-5-sulfamylanthranilic acid (664 gm.) was slurried in 800 ml. glacial acetic acid and 800 gm. liquid phosgene was added with good stirring. It was stirred vigorously for three hours at room temperature, filtered and washed with 1000 ml. acetic acid and 2000 ml. anhydrous ether. After drying in vacuo over phosphorous pentoxide, it weighed 698 gm. and melted at 290–292°. This material was combined with the lots obtained in runs 746–742, and 747–570. The total weight of product was 2214 gm. from 2000 gm. of starting material.

Preparation of 2-amino-4-chloro-5-sulfamyl-N-(o-tolyl)-benzamide, VII.—7-chloro-6-sulfamylisatoic anhydride (720 gm.) was added to a 12 liter nitrogen flushed flask containing 4200 ml. o-toluidine and the mixture was stirred for ½ hour. It was then heated to 178° (solution occurred at 177°) and kept at about 175° for 10 minutes. It was allowed to cool to 60° by removing the heating mantle, then cooled rapidly to 25° with an ice bath. Ether (4200 ml.) was added, the mixture was stirred for a few minutes, filtered and washed thoroughly with ether. The crude product was slurried with 9000 ml. isopropanol, filtered, washed twice with 2000 ml. isopropanol, twice with 2500 ml. 8% aqueous ammonia, once with 2000 ml. water, twice with 1000 ml. isopropanol and finally three times with 2000 ml. ether. After air drying, the product weighed 560 gm. and melted at 287–289°. This partially purified amide was combined with the product obtained in runs 743–870 and 747–574 and the total (1573 gm.) was recrystallized (under Lot #743–871). The amide was dissolved in 3000 ml. dimethylformamide, filtered with celite and heated to 90°. To the resulting solution was added all at once, 1800 ml. 95° water. The suspension that resulted was allowed to cool with stirring over 20 hours, then filtered and washed with 1000 ml. 2:1 dimethylformamide:water, 2000 ml. methanol and 1500 ml. ether. After drying the product weighed 1458 gm. and melted at 289–292° with decomposition.

*Analysis.*—Calc'd for $C_{14}H_{14}ClN_3O_3S$: C, 49.48%; H, 4.15%; N, 12.36%; Cl, 10.43%; S, 9.44%. Found: C, 49.66%; H, 4.23%; N, 12.41%; Cl, 10.43%; S, 9.55%.

Preparation of 2-allyl-3-(o-tolyl)-6-sulfamyl-7-chloro-1,2,3,4-tetrahydro-4-quinazolinone, VIII.—2-amino-4-chloro-5-sulfamyl-N-(o-tolyl)-benzamide (3.4 g.) was slurried in 35 ml. glacial acetic acid. To this slurry was added 2.2 g. 1,1-diethoxy-3-butene and 0.5 ml. concentrated sulfuric acid. The reaction mixture was heated with stirring and then poured into 200 ml. crushed ice to give the crude product.

The other compounds of this invention can be made by modification of ingredients and quantities of the above example as is well understood by those skilled in the art.

From pharmacology tests run on 2-allyl-3-o-tolyl 6 - sulfamyl-7-chloro-1,2,3,4 - tetrahydro - 4(3H) - quinazolinone and other indications and analogy, applicant states that the compounds of this invention are effective diuretics, saluretics, and antihypertensives with low toxicity. For example, the following is a summary of the pharmacology on the above allyl compound:

Summary (a) Symptomatology and acute $LD_{50}$ in mice:
Orally—$LD_{50}$>5000 mg./kg. (48 hours); no symptoms at 1000 mg./kg.
Interperitoneal—$LD_{50}$>1500 mg./kg. (48 hours) some hypothermia and decreased spontaneous motor activity at 1000 mg./kg.

(b) Cardiovascular in dog: Doses intravenously up to 10 mg./kg. were administered. There were no changes in the cardiovascular system.

(c) Diuretic assay in rats: When administered by the oral route in initial assays measiuring output of urine (ml./kg.), $Na^+$, and $Cl^-$ (meq./kg.) at 4 hours and 21 hours after drug administration, the above mentioned allyl compound was found to promote water and salt loss, has a rapid onset and prolonged action, and appears to have a potency on volume diuresis about the same as that of hydrochlorothiazide.

The compounds of this invention may be administered to a patient safely and effectively at dosage amounts the same as hydrochlorothiazide.

In the preceding specification the temperatures, wherever given, are in degrees centigrade.

Various modifications of the structural formula in column 1, lines 46–54, of the specification may be made, such as, for example, has been done for other tetrahydro-7-halo-6-sulfamyl-4-quinazolinones known to the art, without departing from the spirit of the invention which is concerned particularly with the aryl and alkaryl group on the 3-position, and an unsaturated aliphatic group in the 2-position. —A—$R_2$, for example, may be alkenyl such as allyl, butenyl, and the like.

Likewise, therapeutically effective salts of the compounds of the invention may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, maleic, tartaric, and the acidic ion exchange resins such as carboxylic acid, phosphonic acid, and sulfonic acid cation exchange resins to give the therapeutically effective and nontoxic salts of the quinazolinone compound.

I claim:
1. A compound of the formula:

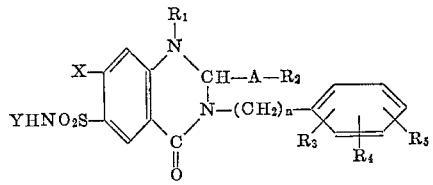

in which X is halogen or trifluoromethyl, Y is hydrogen or lower alkyl, $R_1$ is hydrogen or lower alkyl, A is loweralkenylene, thioloweralkenylene, or loweralkynylene, $R_2$ is hydrogen, $NH_2$, cycloloweralkyl, furyl, thienyl, phenyl, pyridyl, or pyrrolidyl, $R_3$ is hydrogen, lower alkyl, hydroxy, loweralkoxy, $NH_2$, sulfamyl, halogen, or trifluoromethyl, $R_4$ and $R_5$ are any of the members of $R_3$, and $n$ is an integer from 0–4.

2. The compound of claim 1 wherein X is chlorine, Y is hydrogen, $R_1$ is hydrogen, —A—$R_2$ is allyl, $R_3$ is orthomethyl, both $R_4$ and $R_5$ are hydrogen, and $n$ is 0.

3. The compound of claim 1 wherein X is chlorine, Y is hydrogen, $R_1$ is hydrogen, —A—$R_2$ is propenyl, $R_3$ is orthomethyl, both $R_4$ and $R_5$ are hydrogen, and $n$ is 0.

4. The compound of claim 1 wherein X is chlorine, Y is hydrogen, $R_1$ is hydrogen, —A—$R_2$ is isopropenyl, $R_3$ is orthomethyl, both $R_4$ and $R_5$ are hydrogen, and $n$ is 0.

5. The compound of claim 1 wherein X is chlorine, Y is hydrogen, $R_1$ is hyrdogen, —A—$R_2$ is allyl, $R_3$ is orthotrifluoromethyl, both $R_4$ and $R_5$ are hydrogen, and $n$ is 0.

6. The compound of claim 1 wherein X is trifluoromethyl, Y is hydrogen, $R_1$ is hydrogen, —A—$R_2$ is allyl, $R_3$ is orthomethyl, both $R_4$ and $R_5$ are hydrogen, and $n$ is 0.

7. A compound according to claim 1 in the form of its alkali metal salt.

8. The compound of claim 1 wherein X is chlorine, Y is hydrogen, $R_1$ is hydrogen, —A—$R_2$ is allyl, $R_3$, $R_4$, and $R_5$ are hydrogen, and $n$ is 0.

9. The compound of claim 1 wherein X, Y, $R_1$, $R_3$, and $R_4$ are the same as in claim 1, and A—$R_2$ is loweralkenyl.

References Cited
UNITED STATES PATENTS

| | | | |
|---|---|---|---|
| 3,133,918 | 5/1964 | MacPhillamy et al. | 167—650 |
| 3,163,645 | 12/1964 | de Stevens et al. | 167—650 |
| 3,254,076 | 5/1966 | Lund et al. | 167—650 |
| 3,267,095 | 8/1966 | Margerison et al. | 167—650 |
| 3,291,794 | 12/1966 | Huebner | 167—650 |
| 3,360,518 | 12/1967 | Shetty | 260—256.5 |

FOREIGN PATENTS 692,082    4/1967    Belgium.

ALEX MAZEL, *Primary Examiner.*

R. J. GALLAGHER, *Assistant Examiner.*

U.S. Cl. X.R.
424—251